United States Patent
Gu et al.

(10) Patent No.: US 10,554,326 B2
(45) Date of Patent: Feb. 4, 2020

(54) METHOD AND DEVICE FOR FIBER-TO-THE-HOME

(71) Applicant: ZTE CORPORATION, Shenzhen, Guangdong Province (CN)

(72) Inventors: Xiuling Gu, Shenzhen (CN); Hua Jian, Shenzhen (CN); Dahai Dai, Shenzhen (CN)

(73) Assignee: ZTE CORPORATION (CN)

( * ) Notice: Subject to any disclaimer, the term of this patent is extended or adjusted under 35 U.S.C. 154(b) by 133 days.

(21) Appl. No.: 15/736,304

(22) PCT Filed: Apr. 15, 2016

(86) PCT No.: PCT/CN2016/079479
§ 371 (c)(1),
(2) Date: Dec. 14, 2017

(87) PCT Pub. No.: WO2016/202078
PCT Pub. Date: Dec. 22, 2016

(65) Prior Publication Data
US 2018/0198553 A1    Jul. 12, 2018

(30) Foreign Application Priority Data
Jun. 15, 2015    (CN) .......................... 2015 1 0331153

(51) Int. Cl.
*H04J 14/08*    (2006.01)
*H04L 12/28*    (2006.01)
(Continued)

(52) U.S. Cl.
CPC ............ *H04J 14/086* (2013.01); *H04L 12/28* (2013.01); *H04L 12/2856* (2013.01);
(Continued)

(58) Field of Classification Search
CPC ............... H04J 14/086; H04L 12/2863; H04L 12/2856; H04L 12/28; H04L 12/2885;
(Continued)

(56) References Cited

U.S. PATENT DOCUMENTS

2004/0264961 A1    12/2004  Nam et al.
2010/0074628 A1*    3/2010  Murakami .......... H04L 12/2885
                                                                        398/182
(Continued)

FOREIGN PATENT DOCUMENTS

CN    103024611 A    4/2013
CN    104467951 A    3/2015
(Continued)

*Primary Examiner* — Omar J Ghowrwal
(74) *Attorney, Agent, or Firm* — McDonald Hopkins LLC

(57) ABSTRACT

Provided are a fiber-to-the-home implementing method and device. The method includes: receiving, by a virtual Passive Optical Network Medium Access Control (PON MAC) of an Optical Network Unit (ONU), a first packet from an Optical Line Terminal (OLT), determining that the first packet matches the virtual PON MAC, and searching a preset corresponding relationship for a first buffer area corresponding to the virtual PON MAC receiving the first packet; buffering, by the ONU, the received first packet in the searched first buffer area; and sending, by the ONU, the first packet in the first buffer area to a user via a User Network Interface (UNI) corresponding to the first buffer area.

10 Claims, 4 Drawing Sheets

(51) Int. Cl.
*H04Q 11/00* (2006.01)
*H04L 29/06* (2006.01)
*H04B 10/27* (2013.01)

(52) U.S. Cl.
CPC ...... *H04L 12/2861* (2013.01); *H04L 12/2863* (2013.01); *H04L 12/2885* (2013.01); *H04L 63/10* (2013.01); *H04Q 11/00* (2013.01); *H04Q 11/0066* (2013.01); *H04Q 11/0067* (2013.01); *H04B 10/27* (2013.01); *H04Q 2011/0064* (2013.01)

(58) Field of Classification Search
CPC . H04L 12/2861; H04L 63/10; H04Q 11/0066; H04Q 11/0067; H04Q 2011/0064; H04Q 11/00; H04B 10/27
See application file for complete search history.

(56) References Cited

U.S. PATENT DOCUMENTS

2012/0114331 A1* 5/2012 Kamijo ............... H04L 12/12
398/35
2015/0023664 A1* 1/2015 Mukai ................ H04J 14/0242
398/58

FOREIGN PATENT DOCUMENTS

WO  WO-2011020697 A1 * 2/2011 ......... H04J 14/0221
WO  WO2014022966 A1   2/2014

* cited by examiner

METHOD AND DEVICE FOR FIBER-TO-THE-HOME

TECHNICAL FIELD

The present disclosure relates to, but not limited to, the field of Passive Optical Network (PON).

BACKGROUND

At present, fiber access has been widely implemented, and fiber-to-the-home is also very common.

FIG. 1 is a structure composition diagram of fiber-to-the-home networking of the PON in the related art. As shown in FIG. 1, the fiber-to-the-home networking of the PON in the related art includes an Optical Line Terminal (OLT) and one or more Optical Network Units (ONUs). The OLT is connected to multiple ONUs via an optical splitter, and each ONU is mounted in a corresponding user's home.

A fiber-to-the-home implementing method in the related art substantially includes the steps as follows.

After an ONU is successfully registered to an OLT, the OLT sends a packet to the ONU in a broadcast manner, and the ONU receives the packet from the OLT, determines that the packet matches the ONU itself, performs downstream buffering on the received packet, processes the packet in the downstream buffer and then sends it to a user. When it is determined that the packet in the downstream buffer does not match the ONU, the received packet is discarded.

When receiving a packet from the user, the ONU forwards the received packet to the OLT.

SUMMARY

The following is a brief introduction for a subject described herein in detail. The brief introduction is not intended to restrict the scope of protection of claims.

In the fiber-to-the-home implementing method in the related art, it is necessary to mount an ONU in each user's home, so the implementation is relatively complicated. For example, every time a user is opened, an operator needs to arrange operation and maintenance staff to provide a home service of deploying a traditional ONU for each user, and it is necessary to take a person and time, in the user's home, to give the operation and maintenance staff, coming to execute a mounting operation, a reception. If there is a network failure suspected of being related to ONU equipment in the user's home, the operation and maintenance staff needs to make an appointment with the user to provide a home service of troubleshooting. When the traditional ONU has a hardware failure, the operation and maintenance staff needs to make an appointment with the user to replace the ONU equipment. When the traditional ONU has a software failure, the operator and an equipment manufacturer will be under pressure to upgrade a large scale of software versions. Every time a user is closed, the operator needs to recycle the ONU deployed in the user's home, and the operation and maintenance staff needs to make an appointment with the user to recycle the ONU, so that the labor cost is needed. If these ONUs are not recycled, hardware resources will be wasted.

The present disclosure provides a fiber-to-the-home implementing method and device, capable of simply implementing fiber-to-the-home.

A fiber-to-the-home implementing method presets a corresponding relationship among virtual PON Medium Access Controls (MACs) of an ONU, buffer areas and User Network Interfaces (UNIs). The method includes the steps as follows.

A virtual PON MAC of an ONU receives a first packet from an OLT, determines that the first packet matches the virtual PON MAC, and searches the corresponding relationship for a first buffer area corresponding to the virtual PON MAC receiving the first packet.

The ONU buffers the received first packet into the searched first buffer area.

The ONU sends the first packet in the first buffer area to a user via a UNI corresponding to the first buffer area.

In an exemplary embodiment, when the UNI of the ONU receives a second packet from the user, the method further includes the steps as follows.

The ONU searches the corresponding relationship for a second buffer area and a virtual PON MAC corresponding to the UNI receiving the second packet.

The ONU buffers the received second packet into the searched second buffer area.

The ONU sends the second packet in the second buffer area to the OLT via the searched virtual PON MAC.

In an exemplary embodiment, the step that the ONU buffers the received second packet into the searched second buffer area includes that:

the ONU buffers the second packet into an upstream buffer sub-area of the second buffer area.

In an exemplary embodiment, the step that the ONU buffers the received first packet into the searched first buffer area includes that:

the ONU buffers the first packet into a downstream buffer sub-area of the searched first buffer area.

A fiber-to-the-home implementing device at least includes a presetting module, a virtual PON MAC module and a searching module.

The presetting module is configured to preset a corresponding relationship among virtual PON MACs of an ONU, buffer areas and UNIs.

The virtual PON MAC module is configured to receive a first packet from an OLT, determine that the first packet matches the virtual PON MAC module, and send the first packet to a searching module.

The searching module is configured to search the corresponding relationship for a first buffer area corresponding to the virtual PON MAC receiving the first packet, and further configured to buffer the received first packet into the searched first buffer area, and send the first packet in the first buffer area to a user via a UNI corresponding to the first buffer area.

Herein, there are two or more virtual PON MAC modules.

In an exemplary embodiment, the searching module is further configured to:

when the UNI receives a second packet from the user, search the corresponding relationship for a second buffer area and a virtual PON MAC corresponding to the UNI receiving the second packet, and buffer the received second packet into the searched second buffer area; and the virtual PON MAC module is further configured to:

send the second packet in the second buffer area to the OLT.

In an exemplary embodiment, the operation of buffering the received second packet into the searched second buffer area includes:

buffering the second packet into an upstream buffer sub-area of the second buffer area.

In an exemplary embodiment, the operation of buffering the received first packet into the searched first buffer area includes:

buffering the first packet into a downstream buffer sub-area of the searched first buffer area.

A computer-readable storage medium stores a computer-executable instruction. When the computer-executable instruction is executed, the fiber-to-the-home implementing method is implemented.

Compared with the related art, the embodiment of the present disclosure includes that: a virtual PON MAC of an ONU receives a first packet from an OLT, determines that the first packet matches the virtual PON MAC, and searches a preset corresponding relationship for a first buffer area corresponding to the virtual PON MAC receiving the first packet; the ONU buffers the received first packet into the searched first buffer area; and the ONU sends the first packet in the first buffer area to a user via a UNI corresponding to the first buffer area. By means of the solution in the embodiment of the present disclosure, multiple virtual PON MACs in an ONU and corresponding UNIs share other resources of a system to achieve functions of a virtual ONU, and the virtual ONU may enter a user's home via a copper wire and provide a service similar to fiber-to-the-home for the user, thereby simply implementing fiber-to-the-home.

After the drawings and the detailed descriptions are read and understood, other aspects can be understood.

DETAILED DESCRIPTION

Embodiments of the present disclosure will be described hereinbelow in conjunction with the drawings. It is important to note that embodiments in the present disclosure and various modes in the embodiments may be combined mutually under the condition of no conflicts.

Figure 1:
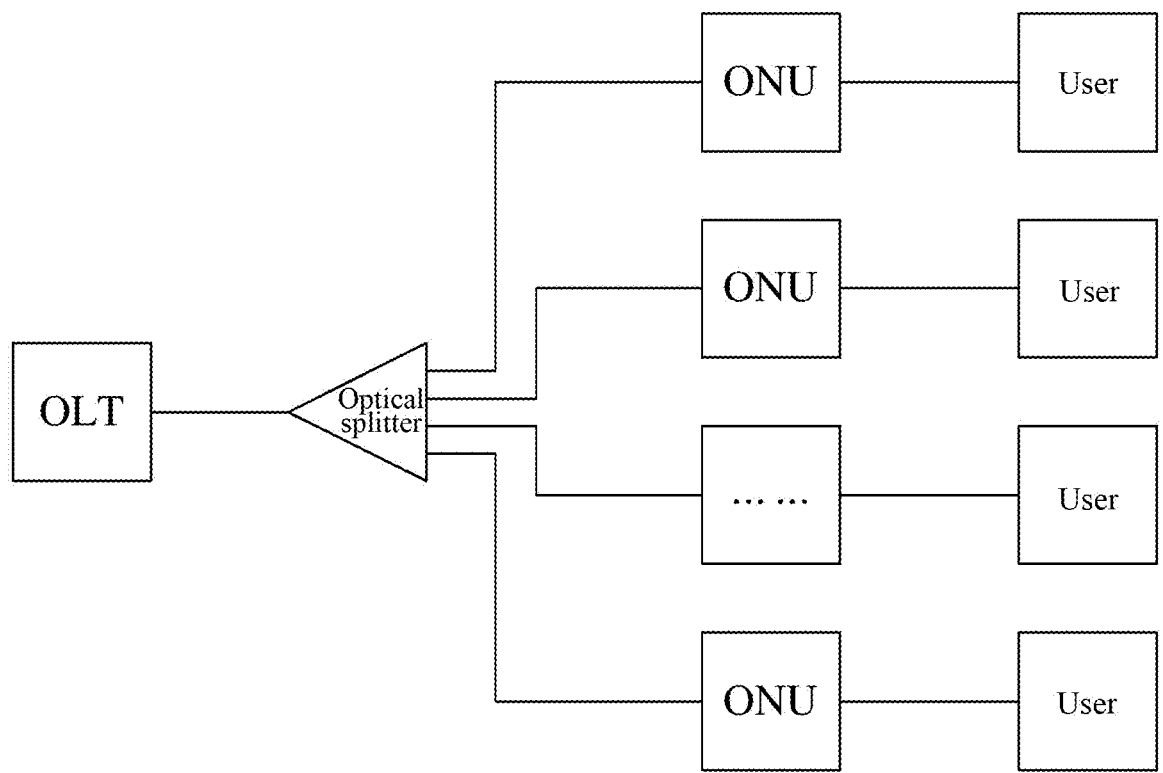
FIG. 1 is a structure composition diagram of fiber-to-the-home networking of the PON in the related art.
Figure 2:
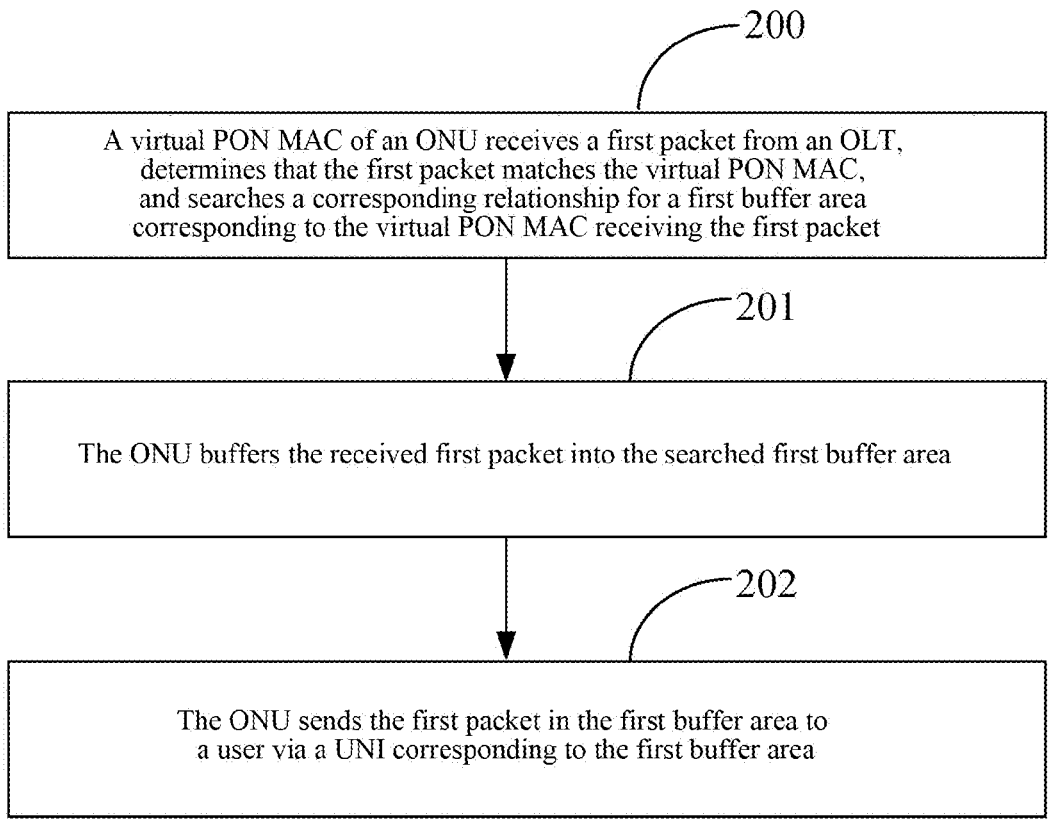
FIG. 2 is a flowchart of a fiber-to-the-home implementing method according to an embodiment of the present disclosure.

Referring to FIG. 2, an embodiment of the present disclosure provides a fiber-to-the-home implementing method. A corresponding relationship among virtual PON MACs of an ONU, buffer areas and UNIs is preset.

Herein, the buffer area may be divided into an upstream buffer sub-area and a downstream buffer sub-area.

In step 200, a virtual PON MAC of an ONU receives a first packet from an OLT, determines that the first packet matches the virtual PON MAC, and searches the corresponding relationship for a first buffer area corresponding to the virtual PON MAC receiving the first packet.

The virtual PON MAC may receive a first packet from the OLT, and when receiving the first packet from the OLT, the virtual PON MAC may determine whether the received first packet matches the virtual PON MAC.

For example, in an Ethernet Passive Optical Network (EPON), after an EPON ONU is registered successfully, the OLT allocates one or more Logical Link Identifiers (LLID) to the EPON ONU. Thus, the virtual PON MAC may determine, via an LLID in the first packet, whether the first packet matches the virtual PON MAC. If the LLID in the first packet is identical to an LLID of the virtual PON MAC, it is determined that the first packet matches the virtual PON MAC. If the LLID in the first packet is different from the LLID of the virtual PON MAC, it is determined that the first packet does not match the virtual PON MAC.

For another example, in a Gigabit-Capable PON, after a GPON ONU is registered successfully, the OLT allocates one or more Allocation Identifiers (Alloc IDs) to the GPON ONU. Thus, the virtual PON MAC may determine, via an Alloc ID in the first packet, whether the first packet matches the virtual PON MAC. If the Alloc ID in the first packet is identical to an Alloc ID of the virtual PON MAC, it is determined that the first packet matches the virtual PON MAC. If the Alloc ID in the first packet is different from the Alloc ID of the virtual PON MAC, it is determined that the first packet does not match the virtual PON MAC.

In step 201, the ONU buffers the received first packet into the searched first buffer area.

Herein, the step that the ONU buffers the received first packet into the searched first buffer area may include that:

the ONU buffers the first packet into a downstream buffer sub-area of the searched first buffer area.

In step 202, the ONU sends the first packet in the first buffer area to a user via a UNI corresponding to the first buffer area.

When the UNI of the ONU receives a second packet from the user, the method may further include the steps as follows.

The ONU searches the corresponding relationship for a second buffer area and a virtual PON MAC corresponding to the UNI receiving the second packet.

The ONU buffers the received second packet into the searched second buffer area.

The ONU sends the second packet in the second buffer area to the OLT via the searched virtual PON MAC.

Herein, the step that the ONU buffers the received second packet into the searched second buffer area may include that:

the ONU buffers the second packet into an upstream buffer sub-area of the second buffer area.

By means of the solution in the embodiment of the present disclosure, multiple virtual PON MACs in an ONU and corresponding UNIs share other resources of a system to achieve functions of a virtual ONU, and the virtual ONU may enter a user's home via a copper wire and provide a service similar to fiber-to-the-home for the user, thereby simply implementing fiber-to-the-home. That is to say, an ONU contains multiple virtual PON MACs, achieving functions of corresponding virtual ONUs respectively, thereby providing fiber-to-the-home experience for multiple users via an ONU.

An embodiment of the present disclosure also provides a computer-readable storage medium, which stores a computer-executable instruction. When the computer-executable instruction is executed, the above-mentioned fiber-to-the-home implementing method is implemented.

Figure 3:
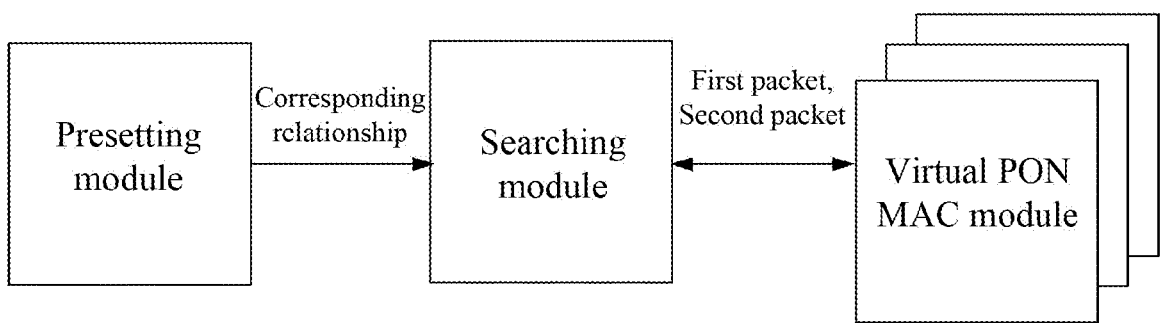
FIG. 3 is a structure composition diagram of a fiber-to-the-home implementing device according to an embodiment of the present disclosure.

Referring to FIG. 3, an embodiment of the present disclosure also provides a fiber-to-the-home implementing device, which may be arranged in an ONU and at least includes a presetting module, a virtual PON MAC module and a searching module.

The presetting module is configured to preset a corresponding relationship among virtual PON MACs of an ONU, buffer areas and UNIs.

The virtual PON MAC module is configured to receive a first packet from an OLT, determine that the first packet matches the virtual PON MAC module, and send the first packet to the searching module.

The searching module is configured to search the corresponding relationship for a first buffer area corresponding to the virtual PON MAC, and further configured to buffer the received first packet into the searched first buffer area, and send the first packet in the first buffer area to a user via a UNI corresponding to the first buffer area.

Herein, there are two or more virtual PON MAC modules.

Herein, the virtual PON MACs in the corresponding relationship may be identified by using identification information, such as MAC addresses of the virtual PON MAC modules or Serial Numbers (SNs) of the virtual PON MAC modules, as long as different virtual PON MAC modules can be distinguished.

In the device of an embodiment of the present disclosure, the searching module may be further configured to:

when the UNI receives a second packet from the user, search the corresponding relationship for a second buffer area and a virtual PON MAC corresponding to the UNI receiving the second packet, and buffer the received second packet into the searched second buffer area.

The virtual PON MAC module may be further configured to:

send the second packet in the second buffer area to the OLT.

In an exemplary embodiment, in the device of an embodiment of the present disclosure, the operation of buffering the received second packet into the searched second buffer area includes:

buffering the second packet into an upstream buffer sub-area of the second buffer area.

In an exemplary embodiment, in the device of an embodiment of the present disclosure, the operation of buffering the received first packet into the searched first buffer area includes:

buffering the first packet into a downstream buffer sub-area of the searched first buffer area.

The fiber-to-the-home implementing device will be illustrated hereinbelow in detail via the embodiments.

Figure 4:
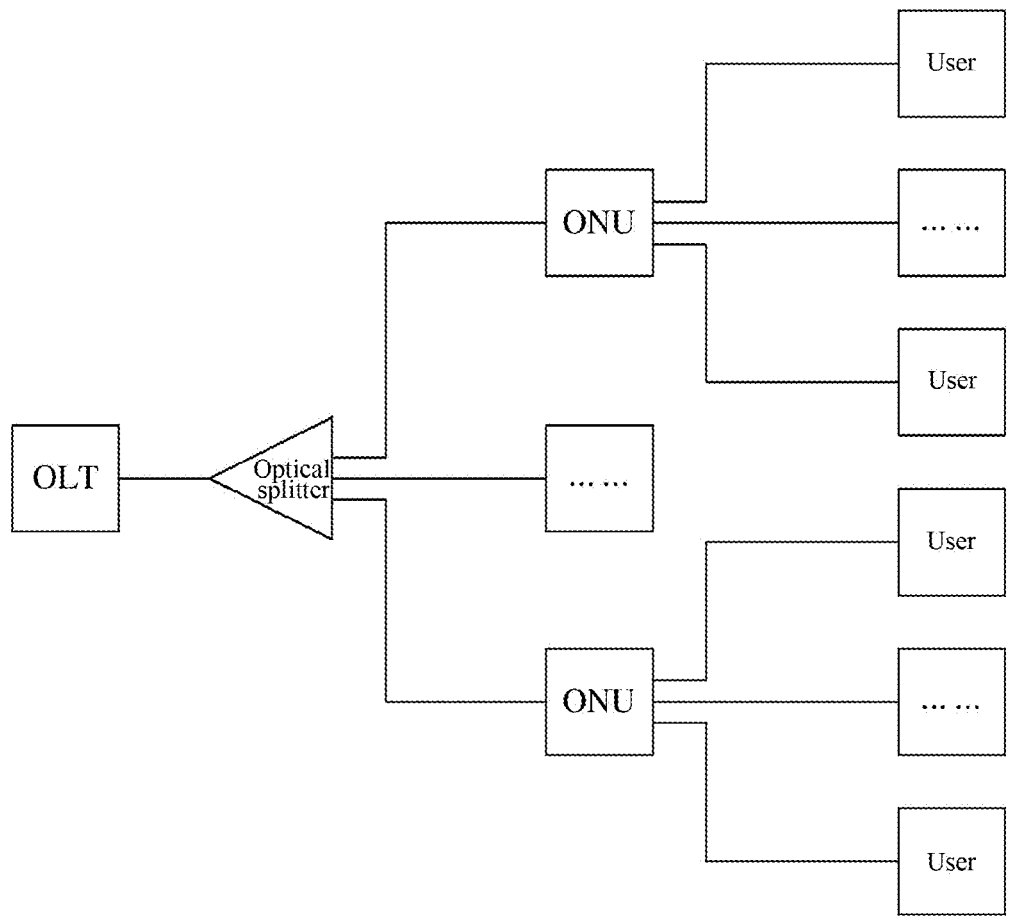
FIG. 4 is a structure composition diagram of fiber-to-the-home networking of the PON according to a first embodiment of the present disclosure.

First Embodiment: FIG. 4 is a structure composition diagram of fiber-to-the-home networking of the PON according to a first embodiment of the present disclosure. As shown in FIG. 4, each ONU contains multiple UNIs, and each UNI may be accessed to a user's home via a copper wire and provide a service similar to fiber-to-the-home for the user.

Figure 5:
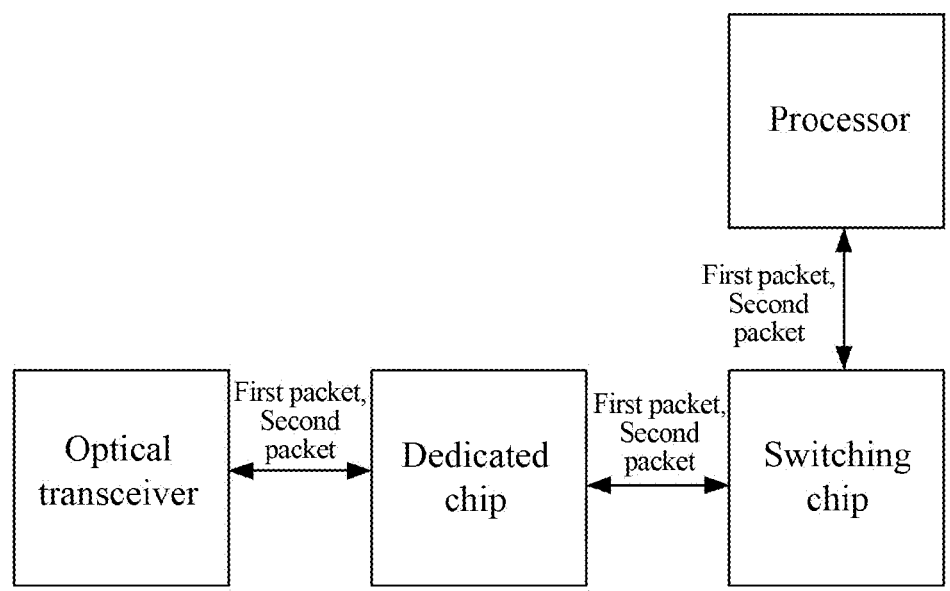
FIG. 5 is a structure composition diagram of a fiber-to-the-home implementing device according to a second embodiment of the present disclosure.

Second Embodiment: referring to FIG. 5, the fiber-to-the-home implementing device may include an optical transceiver, a dedicated chip, a switching chip and a processor.

The optical transceiver is configured to receive a first packet from an OLT, and send the received first packet to a virtual PON MAC module of a dedicated chip.

The dedicated chip presets a corresponding relationship between virtual PON MACs and Network Node Interfaces (NNIs). And there are two or more virtual PON MAC modules. The dedicated chip is configured to determine that the first packet matches the virtual PON MAC module, search the corresponding relationship between virtual PON MACs and NNIs for an NNI corresponding to the virtual PON MAC module receiving the first packet, and send the received first packet to a switching chip via the searched NNI.

The switching chip presets a corresponding relationship among NNIs, buffer areas and UNIs, and is configured to, when determining that the first packet does not need to be processed by a processor, search the corresponding relationship among NNIs, buffer areas and UNIs for a first buffer area corresponding to the NNI sending the first packet, and buffer the received first packet into a downstream buffer sub-area in the first buffer area; send the first packet in the downstream buffer sub-area in the first buffer area to a user via a UNI corresponding to the first buffer area; and when determining that the first packet needs to be processed by the processor, send the first packet to the processor before searching the corresponding relationship among NNIs, buffer areas and UNIs for the first buffer area corresponding to the NNI sending the first packet, and receive the first packet from the processor.

The processor is configured to perform a corresponding process on the received first packet, and then send it to the switching chip.

Herein, the switching chip may be further configured to:

when the UNI receives a second packet from the user and the switching chip determines that the second packet does not need to be processed by the processor, search the corresponding relationship among NNIs, buffer areas and UNIs for a second buffer area and an NNI corresponding to the UNI receiving the second packet, buffer the second packet into an upstream buffer sub-area in the second buffer area, and send the second packet to the dedicated chip via the searched NNI; and when the switching chip determines that the second packet needs to be processed by the processor, send the second packet to the processor before searching the corresponding relationship among NNIs, buffer areas and UNIs for the second buffer area and the NNI corresponding to the UNI receiving the second packet, and receive the second packet from the processor.

The dedicated chip may be further configured to:

search the corresponding relationship between virtual PON MACs and NNIs for a virtual PON MAC corresponding to an NNI sending the second packet, and send the second packet to the optical transceiver via a virtual PON MAC module corresponding to the searched virtual PON MAC.

The processor may be further configured to:

perform a corresponding process on the received second packet, and then send it to the switching chip.

The optical transceiver may be further configured to:

send the received second packet to the OLT.

Figure 6:
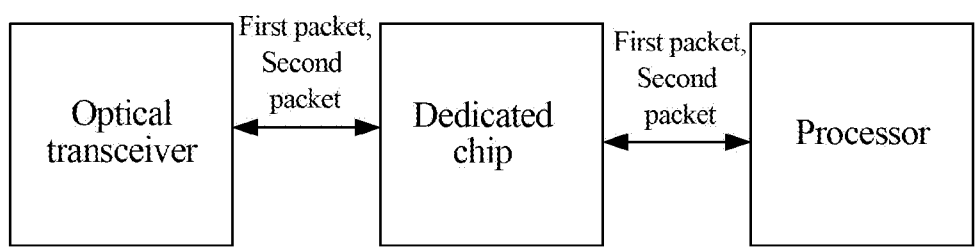
FIG. 6 is a structure composition diagram of a fiber-to-the-home implementing device according to a third embodiment of the present disclosure.

Third Embodiment: referring to FIG. 6, the fiber-to-the-home implementing device may include an optical transceiver, a dedicated chip and a processor.

The optical transceiver is configured to receive a first packet from an OLT, and send the received first packet to a virtual PON MAC module of a dedicated chip.

The dedicated chip presets a corresponding relationship among virtual PON MACs, buffer areas and UNIs. There are two or more virtual PON MAC modules. The dedicated chip is configured to determine that the first packet matches the virtual PON MAC module, and when determining that the first packet does not need to be processed by a processor, search the corresponding relationship among virtual PON MACs, buffer areas and UNIs for a first buffer area corresponding to the virtual PON MAC receiving the first packet, and buffer the received first packet into a downstream buffer sub-area in the first buffer area; send the first packet in the downstream buffer sub-area in the first buffer area to a user via a UNI corresponding to the first buffer area; and when determining that the first packet needs to be processed by the processor, send the first packet to the processor before searching the corresponding relationship among virtual PON MACs, buffer areas and UNIs for the first buffer area corresponding to the virtual PON MAC receiving the first packet, and receive the first packet from the processor.

The processor is configured to perform a corresponding process on the received first packet, and then send it to the dedicated chip.

Herein, the dedicated chip may be further configured to:

when the UNI receives a second packet from the user and the dedicated chip determines that the second packet does not need to be processed by the processor, search the corresponding relationship among virtual PON MACs, buffer areas and UNIs for a second buffer area and a virtual PON MAC corresponding to the UNI receiving the second packet, buffer the second packet into an upstream buffer sub-area in the second buffer area, and send the second packet to the optical transceiver via a virtual PON MAC module corresponding to the searched virtual PON MAC; and when the dedicated chip determines that the second packet needs to be processed by the processor, send the second packet to the processor before searching the corresponding relationship among virtual PON MACs, buffer areas and UNIs for the second buffer area and the virtual PON MAC corresponding to the UNI receiving the second packet, and receive the second packet from the processor.

The processor may be further configured to:

perform a corresponding process on the received second packet, and then send it to the dedicated chip.

The optical transceiver may be further configured to:

send the received second packet to the OLT.

Figure 7:
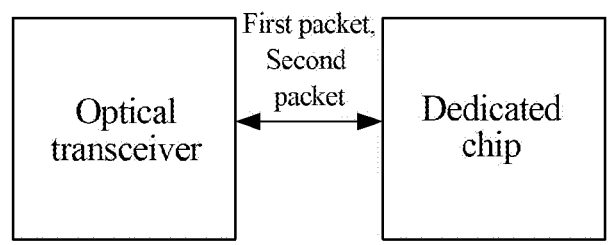
FIG. 7 is a structure composition diagram of a fiber-to-the-home implementing device according to a fourth embodiment of the present disclosure.

Fourth Embodiment: referring to FIG. 7, the fiber-to-the-home implementing device may include an optical transceiver and a dedicated chip.

The optical transceiver is configured to receive a first packet from an OLT, and send the received first packet to a virtual PON MAC module of a dedicated chip.

The dedicated chip including two or more virtual PON MAC modules presets a corresponding relationship among virtual PON MACs, buffer areas and UNIs. The dedicated chip is configured to determine that the first packet matches the virtual PON MAC module, search the corresponding relationship among virtual PON MACs, buffer areas and UNIs for a first buffer area corresponding to the virtual PON MAC receiving the first packet, and buffer the received first packet into a downstream buffer sub-area in the first buffer area; and perform a corresponding process on the first packet in the downstream buffer sub-area in the first buffer area, and then send it to a user via a UNI corresponding to the first buffer area.

Herein, the dedicated chip may be further configured to:

when the UNI receives a second packet from the user, search the corresponding relationship among virtual PON MACs, buffer areas and UNIs for a second buffer area and a virtual PON MAC corresponding to the UNI receiving the second packet, buffer the second packet into an upstream buffer sub-area in the second buffer area, and send the second packet in the upstream buffer sub-area in the second buffer area to the optical transceiver via a virtual PON MAC module corresponding to the searched virtual PON MAC.

The optical transceiver may be further configured to:

send the received second packet to the OLT.

In embodiments of the present disclosure, functions of multiple PON MAC chips are achieved by means of a dedicated chip, and functions of N (N>1) pieces of original ONU equipment distributed in users' homes are centralized on a piece of ONU equipment, therefore the N pieces of equipment are reduced to a piece of equipment, and the hardware cost is greatly reduced. The functions of N pieces of original ONU equipment are centralized on a piece of ONU equipment, so that when version upgrade is needed in case of a software failure of the equipment, the quantity of ONU equipment to be upgraded is reduced to 1/N of the original quantity, thereby greatly alleviating the upgrade pressure. According to the solution, original ONU equipment distributed in the users' homes are transferred to a certain place (such as a corridor equipment box, and other equipment storage positions arranged by a property management company) outside the users' homes in a centralized manner, so that not only it is unnecessary to reserve a position for mounting ONU equipment and unnecessary to reserve a power supply interface for mounting an ONU in the user's home, but also operation and maintenance staff does not need to provide a home service of mounting. Since only a UNI user interface is provided for a user in this solution, troubleshooting can be performed at an equipment arrangement site after a failure occurs, so that the operation and maintenance staff does not need to provide a home service of troubleshooting. The solution can meet fiber-to-the-home demands for rapid opening, high-efficient maintenance, energy conservation and environmental protection.

Those of ordinary skill in the art can understand that all or some of the steps in the above-mentioned embodiments may be implemented by using a computer program flow. The computer program may be stored in a computer-readable storage medium. The computer program is executed on a corresponding hardware platform (such as system, equipment, device or apparatus or the like). During execution, the computer program includes one of the steps of the method embodiment or a combination thereof.

In an exemplary embodiment, all or some of the steps in the above-mentioned embodiments may also be implemented by using an integrated circuit. These steps may be manufactured into integrated circuit modules respectively, or multiple modules or steps therein are manufactured into a single integrated circuit module.

The device/function module/function unit in the above-mentioned embodiments may be implemented by using a general computation device. They may be centralized on a single computation device or may be distributed on a network composed of multiple computation devices.

When being implemented in a form of software function module and is sold or used as an independent product, the device/function module/function unit in the above-mentioned embodiments may be stored in a computer-readable storage medium. The above-mentioned computer-readable storage medium may be a read-only memory, a magnetic disk or an optical disk or the like.

INDUSTRIAL APPLICABILITY

By means of the solution in the embodiments of the present disclosure, multiple virtual PON MACs in an ONU and corresponding UNIs share other resources of a system to achieve functions of a virtual ONU, and the virtual ONU may enter a user's home via a copper wire and provide a service similar to fiber-to-the-home for the user, thereby simply implementing fiber-to-the-home.

What we claim is:

1. A fiber-to-the-home implementing method comprising:
presetting a corresponding relationship among virtual Passive Optical Network Medium Access Controls, PON MACs, of an Optical Network Unit, ONU, buffer areas and User Network Interfaces, UNIs, and the method further comprising:
receiving, by a virtual PON MAC of the ONU, a first packet from an Optical Line Terminal, OLT, determining that the first packet matches the virtual PON MAC, and searching the corresponding relationship for a first buffer area corresponding to the virtual PON MAC receiving the first packet;
buffering, by the ONU, the received first packet into the searched first buffer area; and
sending, by the ONU, the first packet in the first buffer area to a user via a UNI corresponding to the first buffer area.

2. The method according to claim 1, wherein when the UNI of the ONU receives a second packet from the user, the method further comprising:
searching, by the ONU, the corresponding relationship for a second buffer area and a virtual PON MAC corresponding to the UNI receiving the second packet;
buffering, by the ONU, the received second packet into the searched second buffer area; and
sending, by the ONU, the second packet in the second buffer area to the OLT via the searched virtual PON MAC.

3. The method according to claim 2, wherein buffering, by the ONU, the received second packet into the searched second buffer area comprises:
buffering, by the ONU, the second packet into an upstream buffer sub-area of the second buffer area.

4. The method according to claim 2, wherein buffering, by the ONU, the received first packet into the searched first buffer area comprises:
buffering, by the ONU, the first packet into a downstream buffer sub-area of the searched first buffer area.

5. The method according to claim 1, wherein buffering, by the ONU, the received first packet into the searched first buffer area comprises:
buffering, by the ONU, the first packet into a downstream buffer sub-area of the searched first buffer area.

6. A fiber-to-the-home implementing device comprising a processor and an accessible storage medium where stores instructions thereon, wherein the instructions, when being executed by the processor, cause the processor to:
preset a corresponding relationship among virtual Passive Optical Network Medium Access Controls PON MACs of an Optical Network Unit, ONU, buffer areas and User Network Interfaces, UNIs;
when a virtual PON MAC receives a first packet from an Optical Line Terminal, OLT, determine that the first packet matches the virtual PON MAC; and
search the corresponding relationship for a first buffer area corresponding to the virtual PON MAC receiving the first packet, and further buffer the received first packet into the searched first buffer area, and send the first packet in the first buffer area to a user via a UNI corresponding to the first buffer area; wherein there are two or more virtual PON MACs.

7. The device according to claim 6, wherein the instructions, when being executed by the processor, further cause the processor to:
when the UNI receives a second packet from the user, search the corresponding relationship for a second buffer area and a virtual PON MAC corresponding to the UNI receiving the second packet, and buffer the received second packet into the searched second buffer area; and
send the second packet in the second buffer area to the OLT.

8. The device according to claim 7, wherein the operation of buffering the received first packet into the searched first buffer area comprises:
buffering the first packet into a downstream buffer sub-area of the searched first buffer area.

9. The device according to claim 7, wherein the operation of buffering the received second packet into the searched second buffer area comprises:
buffering the second packet into an upstream buffer sub-area of the second buffer area.

10. The device according to claim 6, wherein the operation of buffering the received first packet into the searched first buffer area comprises:
buffering the first packet into a downstream buffer sub-area of the searched first buffer area.

* * * * *